June 11, 1929.  E. SWEDBLOM  1,717,278
SWEEP HAYRAKE ATTACHMENT
Filed Nov. 18, 1926  3 Sheets-Sheet 1
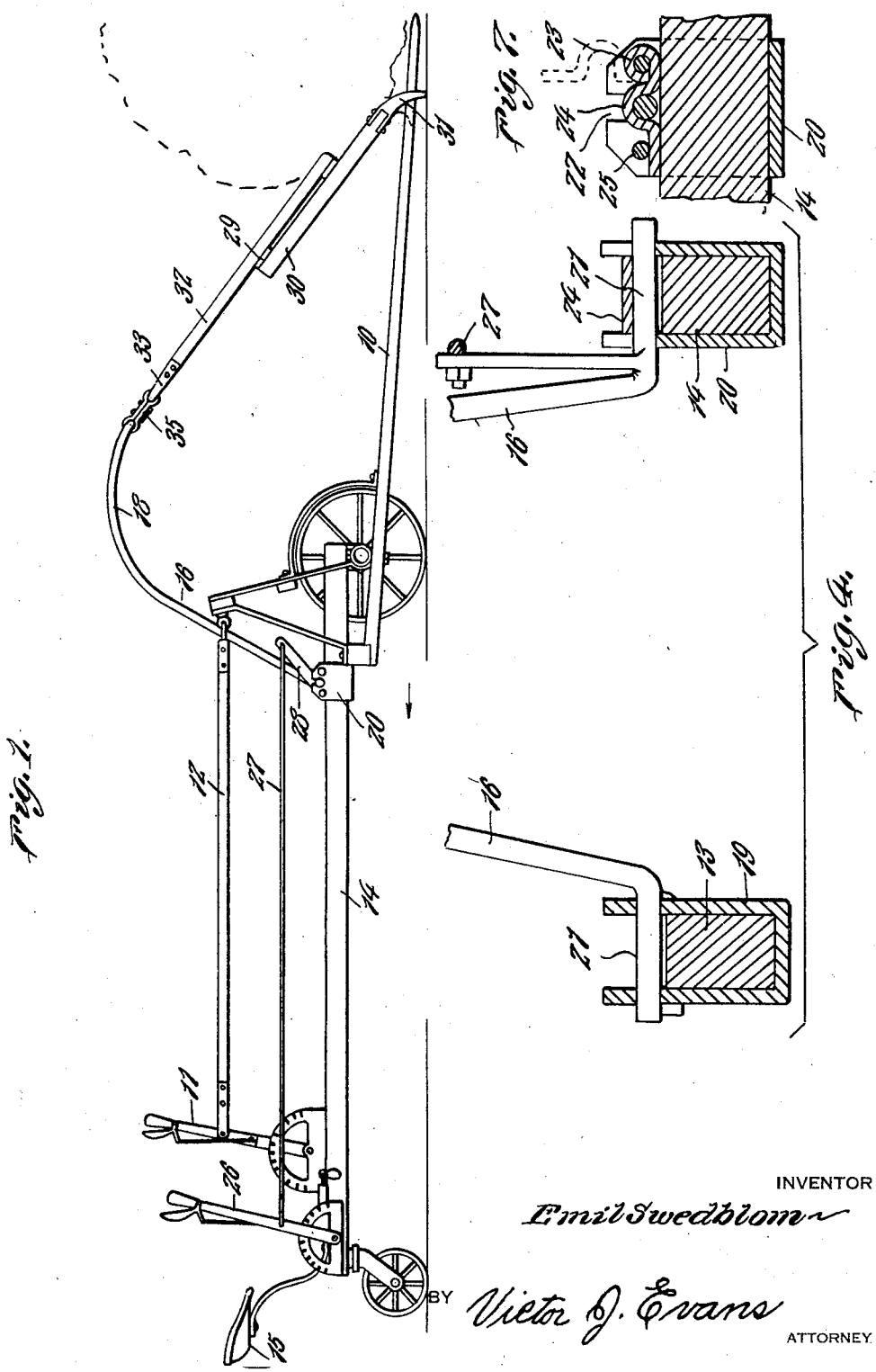
INVENTOR
Emil Swedblom
BY Victor J. Evans
ATTORNEY

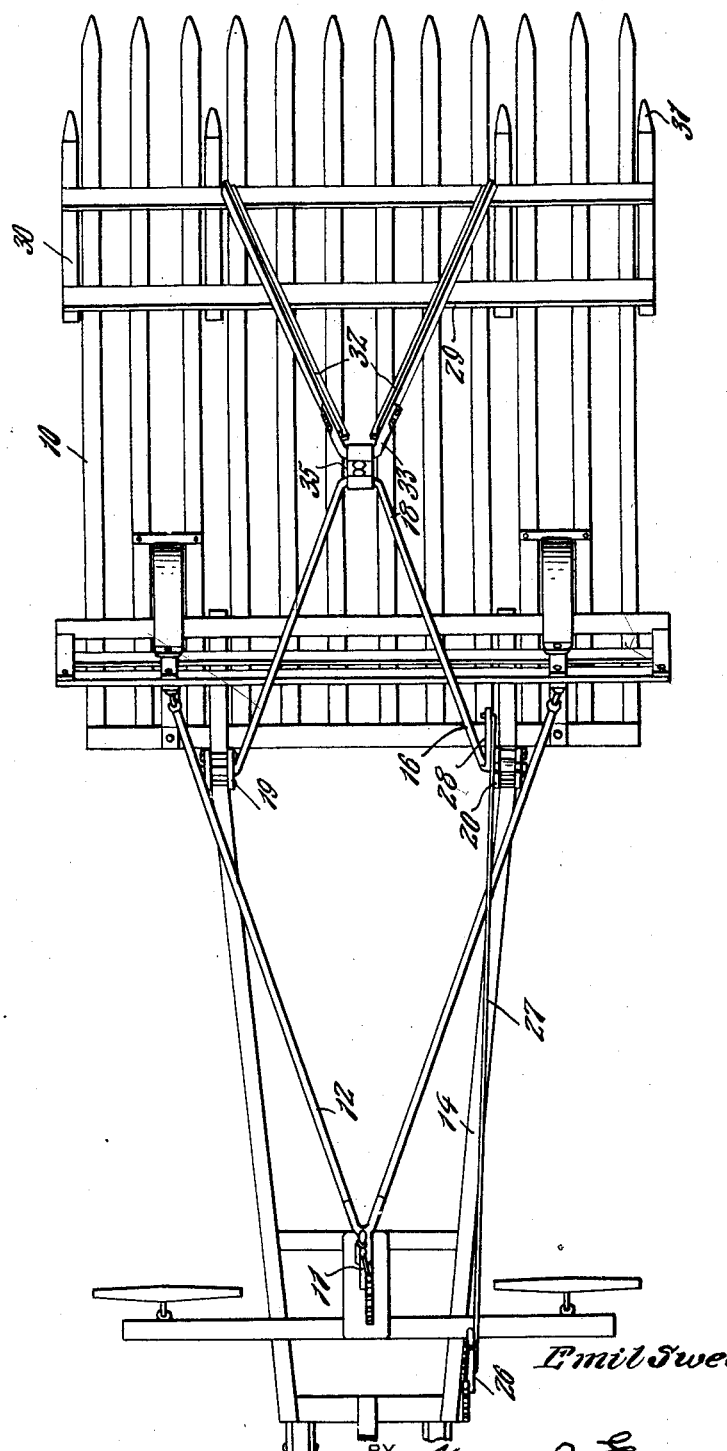

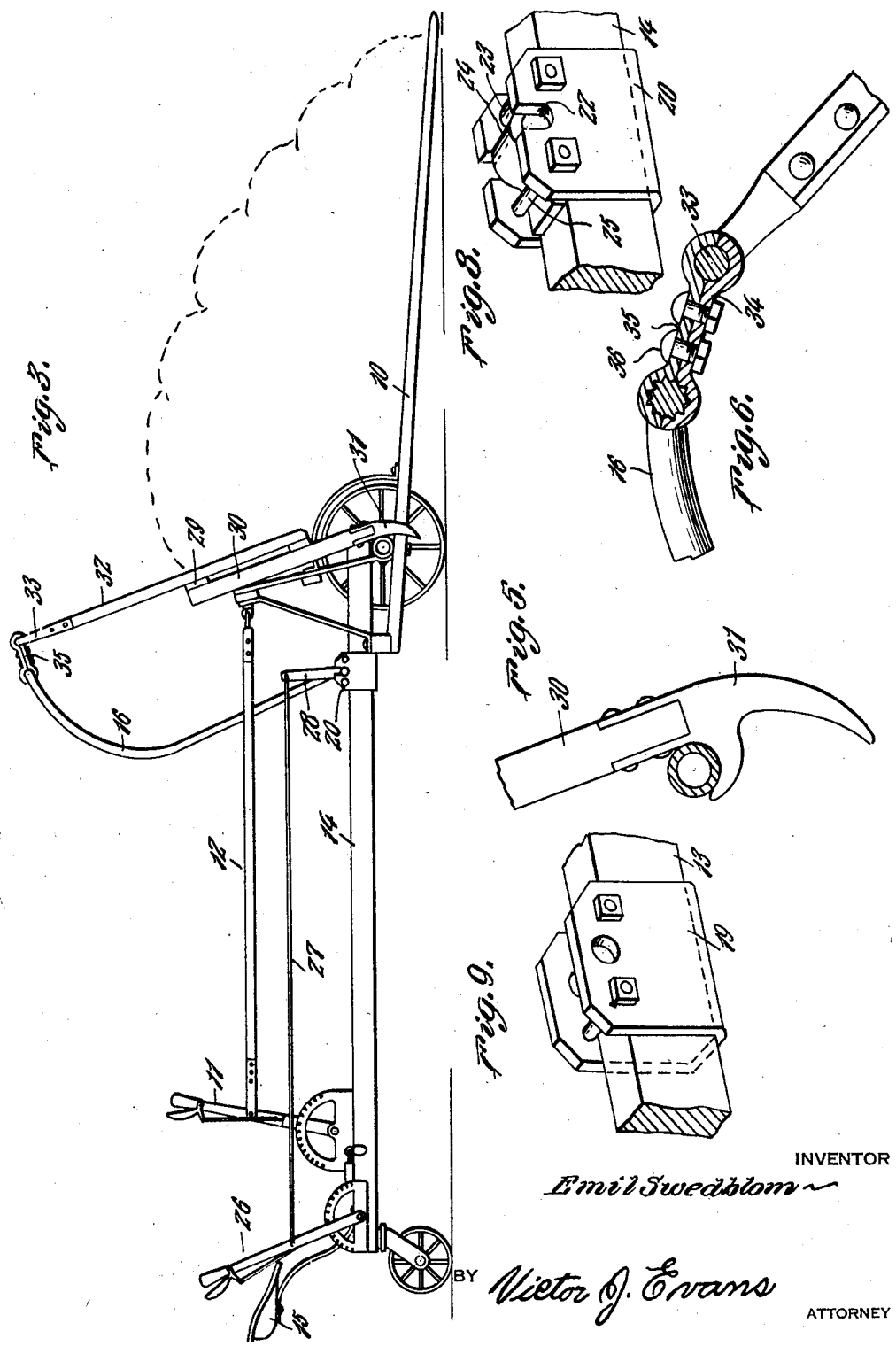

Patented June 11, 1929.

1,717,278

UNITED STATES PATENT OFFICE.

EMIL SWEDBLOM, OF CASCADE, MONTANA.

SWEEP HAYRAKE ATTACHMENT.

Application filed November 18, 1926. Serial No. 149,183.

This invention comprehends the provision of a hay rake attachment designed to facilitate the removal of the load from the rake at the proper time and place, the attachment being of novel construction and operated from a point within convenient reach of the driver's seat.

In carrying out the invention I provide means for associating the attachment with the rake, without boring holes in the frame of the latter or in any way altering its construction.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of a hay rake showing the application and manner of using the attachment.

Figure 2 is a top plan view.

Figure 3 is a view similar to Figure 1 showing the normal position of the attachment.

Figure 4 is a view showing the side members of the frame in section and the manner in which the yoke is mounted for pivotal movement on the frame.

Figure 5 is a fragmentary view of one of the pusher arms of the movable frame.

Figure 6 is a sectional view through the connection between the yoke and movable frame.

Figure 7 is a sectional view through one of the clamps shown in Figure 4.

Figure 8 is a perspective view of said clamp.

Figure 9 is a similar view of the other clamp.

Referring to the drawings in detail 10 indicates generally the rake head which is mounted upon a wheeled frame and capable of being raised and lowered with relation to the ground by means of a lever 11 which is connected with the rake head by means of a rod 12. The wheeled frame includes spaced side members 13 and 14 respectively, while mounted on the frame adjacent one end is a seat 15.

The attachment forming the subject matter of the present invention comprises a yoke of substantially inverted V-shaped formation, the limbs 16 of which are journaled upon the side members of the wheeled frame, whereby the yoke can be moved pivotally on said frame for a purpose to be hereinafter described. The upper end of this yoke is curved forwardly as clearly indicated at 18 in Figure 1 and is adapted to be connected with a movable frame constructed to push the load off the rake head 10 upon movement of the yoke in one direction. While the yoke can be pivotally mounted upon the wheeled frame in any suitable manner, I preferably make use of substantially U-shaped brackets 19 and 20 respectively which straddle the frame members 13 and 14 as shown in Figure 4. The parallel limbs of the bracket 19 project above the frame member 13 and are provided with aligned openings to receive the offset extremity 21 of the adjacent limb 16. The U-shaped member 20 also has its parallel limbs projecting above the frame member 14, one of said limbs being provided with an opening while the other is formed with a slot 22 to permit the offset extremity 21 of the adjacent limb 16 to be easily associated with or removed from the member 20 when desired. Pivoted between the parallel limbs of the clamp 20 is a plate 23 which has a bulged portion 24 to fit over the offset extremity 21 of the adjacent limb, to hold the yoke against casual separation from the frame. The free end of the plate reposes upon the frame member 14 and is held immovable by a cross pin 25. The yoke above mentioned is mounted for pivotal movement upon the frame, and is controlled by a lever 26 arranged within convenient reach of the driver when occupying the seat 15. This lever is connected by an operating rod 27 to a crank arm 28 projected from the offset extremity 21 of the adjacent limb of the yoke. The lever 26 can be held in any given position by a suitable pawl and rack bar as shown.

The movable frame associated with the yoke consists of spaced parallel members 29 which are arranged transversely across the rake head, and which support a plurality of pusher arms 30, each of which is provided with a curved metallic foot piece 31 as clearly shown in Figure 5. These pusher arms are adapted to move longitudinally of the rake head 10, with the pusher arms moving between the teeth of the rake, and used in connection with the members 29 for pushing the load off the rake head when desired. A yoke including angle iron bars 32 and a connecting piece 33 is secured to the movable frame, and pivotally mounted on a clamp connected with the adjacent end of the yoke above mentioned. This clamp is preferably made in two parts 34 and 35 respectively which are bolted or otherwise suitably secured together as at 36. These parts of the clamp are designed to embrace the adjacent end of the yoke 16, being serrated to effectively grip the latter as clearly illustrated in Figure 6, while the opposite ends of the clamp are designed to embrace the connecting piece 33 of the yoke for the movable frame, supporting the latter for pivotal movement as will be readily understood.

In operation or use of the invention, the movable frame with its pusher arms 30 normally occupies the position shown in Figure 3, so that as the machine is moved over the ground the rake head 10 gathers or accummulates its load in the usual manner. When the machine has reached a point where it is desired to relieve the rake head of its load, the operation is materially facilitated by the attachment above described. For this purpose the lever 26 is moved forwardly thereby rocking the yoke 16 upon its pivots, and shifting the movable frame longitudinally of the rake head 10 to the position illustrated in Figure 1. It is manifest, that as the frame is moved along the rake head, the load is engaged by the frame including the arms 30 and moved off the end of the head. As above stated the attachment can be associated with any hay rake without the necessity of boring holes through the frame members or making any other alterations therein.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. The combination with a rake including a wheeled frame and a rake head arranged at one end thereof, of spaced bearing members secured to said frame, a pair of reversely disposed substantially yoke shaped members arranged in end to end relation, a two-part clamp connecting the adjacent ends of the said yoke shaped members together for pivotal movement, one of said yoke shaped members having its extremities offset to provide trunnions journaled in said bearings, said member being curved in the direction of the other yoke-shaped member, a crank arm rising from one of said trunnions, a manually operated lever mounted on the frame, a rod connecting the lever with said crank arm whereby the other mentioned yoke member can be moved longitudinally of the rake head, and a frame carried by the second mentioned yoke, and a plurality of push arms carried by said frame and movable between the teeth of the rake head for the purpose specified.

2. The combination with a rake including a wheeled frame and a rake head arranged at one end thereof, of an attachment including a yoke rising from the frame and having its closed end curved in the direction of the rake head, a second reversely arranged yoke having its closed end arranged adjacent the similar end of the first mentioned yoke, a two-part clamp connecting the adjacent closed ends of the respective yokes and supporting said second mentioned yoke for pivotal movement, and pusher arms supported by the said second mentioned yoke and adapted to be moved longitudinally of the rake head and between the teeth thereof incident to the movements of said yokes, and means for operating said yokes.

In testimony whereof I affix my signature.

EMIL SWEDBLOM.